Aug. 24, 1965     D. C. LOCKHART     3,202,142
ROTARY ENGINE
Filed July 22, 1963     3 Sheets-Sheet 1
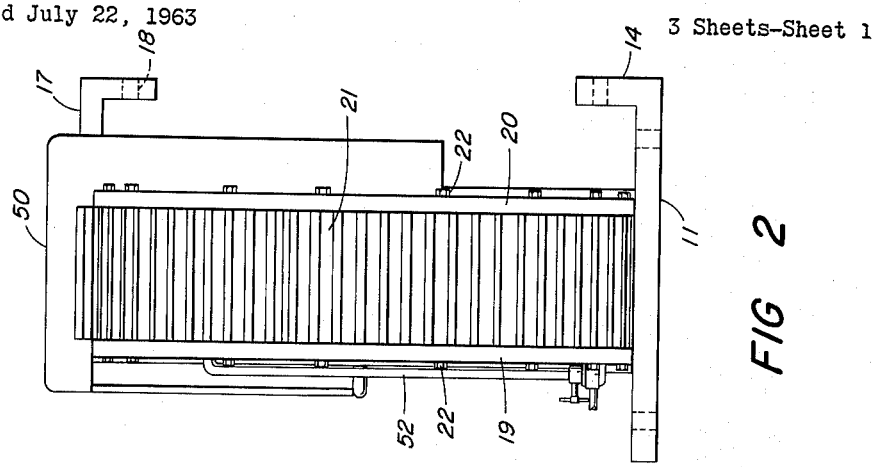
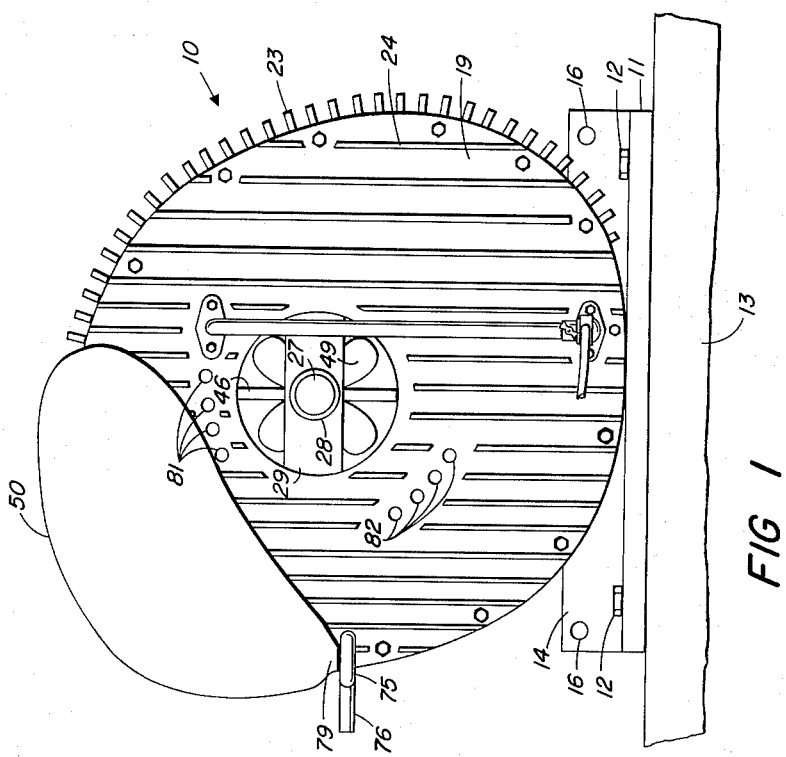
INVENTOR.
DERRELL C. LOCKHART
BY
ATTORNEY Aug. 24, 1965         D. C. LOCKHART                3,202,142
                        ROTARY ENGINE
Filed July 22, 1963                          3 Sheets-Sheet 2
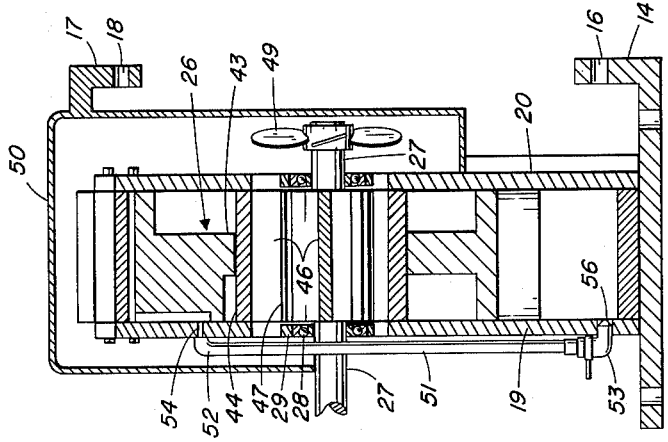
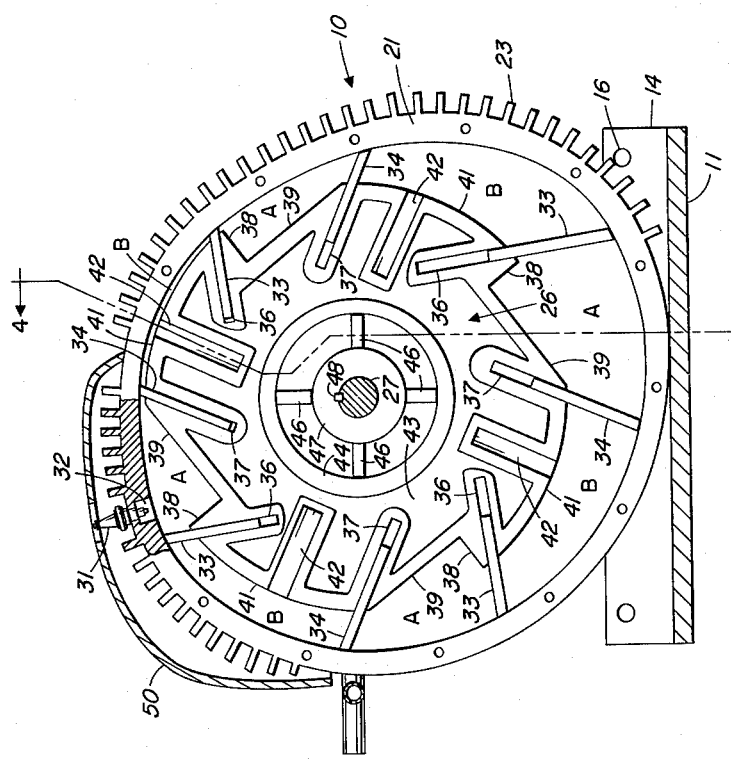
INVENTOR.
DERRELL C. LOCKHART
BY
ATTORNEY Aug. 24, 1965  D. C. LOCKHART  3,202,142
ROTARY ENGINE
Filed July 22, 1963  3 Sheets-Sheet 3

INVENTOR.
DERRELL C. LOCKHART
BY
ATTORNEY 3,202,142
ROTARY ENGINE
Derrell C. Lockhart, Box 312, Newhall, Iowa
Filed July 22, 1963, Ser. No. 296,616
6 Claims. (Cl. 123—16)

This invention relates in general to internal combustion engines and in particular to an improved rotary engine.

This invention constitutes an improvement on my prior patent to rotary internal combustion engine Number 3,076,446 which issued on February 5, 1963. My prior patent discloses a rotary engine with alternate combustion and compression chambers with the compression chambers super charging the fuel mixture and providing a buffer between the combustion chambers to prevent pre-ignition. In that structure radial movable vanes are mounted in the rotor to provide compression and a surface for motive power against which the expanding gases may work.

The present invention constitutes an improvement in that the motor vanes and combustion chamber are completely reshaped to provide a more efficient power coupling. The vanes are set at an angle other than radial and the combustion chamber is formed to provide a more efficient force diagram for the rotor.

An object of the invention is to provide an improved engine which has greater efficiency and power than prior engines.

Another object is to provide an inexpensive rotary combustion engine which may be mounted horizontally or vertically.

Yet another object is to provide a rotary engine with an improved fuel feeding system.

A feature of this invention is found in the provision for a stator which rotatably supports an eccentric rotor which has alternate combustion and compression chambers to prevent pre-ignition. The combustion chambers are cut so as to provide efficient power transfer and moveable vanes are set in slots in the rotor at an angle other than radial to provide seals in the engine.

Further, features, objects and advantages will become apparent from the following description and claims when read in view of the drawings, in which:

FIGURE 1 is a front view of the engine according to this invention,

FIGURE 2 is a side view of the invention,

FIGURE 3 is a sectional view showing the rotor of the engine,

FIGURE 4 is a sectional view which shows the cooling housing,

Figure 6:
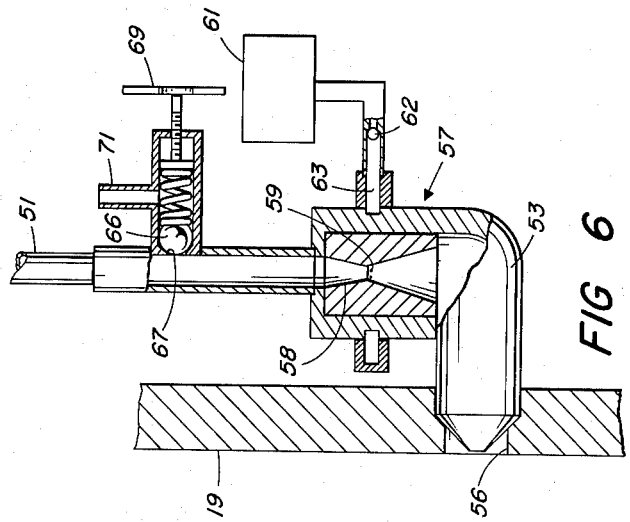
FIGURE 6 shows the fuel system of the engine.

FIGURE 1 illustrates the engine 10 of this invention which comprises a base plate 11 which may be attached by bolts 12 to a suitable base 13. The base plate 11 has an upwardly extending flange 14 which is formed with openings 16.

As shown in FIGURE 2, a bracket 17 is attached to the motor 10 at a point displaced from base plate 11 and is formed with openings 18. Bracket 17 and flange 14 allow the motor to be mounted horizontally rather than vertically as shown in FIGURES 1 and 2. The engine operates equally well in either position.

The engine consists of a housing comprising a pair of cover plates 19 and 20 which are attached to a generally cylindrical member 21 by suitable bolts 22. Cooling fins 23 are attached to member 21 and cooling fins 24 are attached to cover plates 19 and 20.

A rotor 26, best shown in FIGURES 3 and 4 is mounted within the cylindrical member 21 and cover plates 19 and 20.

The rotor consists of a motor output shaft 27 which extends from the engine and is supported by suitable bearings 28 mounted in bearing supports 29 integrally formed with cover plates 19 and 20. The shaft 27 is the output power shaft of the engine and may be connected to a suitable utilization means as for example, a lawn mower, etc.

It is to be noted that the rotor and output shaft are non-symmetrically mounted within cylindrical member 21. This is to allow the fuel to be compressed for ignition and to allow expansion during the power portion of the cycle. As shown in FIGURE 3 the rotor 26 is mounted above the center of cylindrical member 21. The rotor turns counter-clockwise relative to FIGURE 3 and a spark-plug 31 is mounted in member 21 and extends into the engine. The electrodes of the spark plug are within a recess 32 so that the rotor 26 does not engage the plug.

The plug is mounted at about eleven o'clock relative to FIGURE 3.

The rotor 26 is formed of alternate combustion chambers A and compression chambers B. This accomplishes at least two results, (1) the combustion chambers are insulated from each other so that burning gases do not escape into an adjoining combustion chamber and cause pre-ignition and (2) fuel is super-charged in the compression chambers before being supplied to the combustion chamber.

The particular engine illustrated has four combustion chambers A and four compression chambers B. These chambers are separated by movable vanes 33 and 34 which are received in slots 36 and 37 formed in the rotor 26.

Vanes 33 form the front walls of combustion chambers A and are mounted in slots 36. Slots 36 are cut into the rotor so that they make about a forty-five degree angle with a radial through the center of the rotor. This provides an improved engine in that the expanding gases after ignition are able to push the vanes more efficiently than when the vanes are mounted radially.

Vanes 36 are mounted in slots 37 so that they make a smaller angle with a radial of the rotor than vanes 33 do.

The chambers A are cut so as to have two surfaces 38 and 39. Surface 38 is substantially radial whereas surface 39 joints surface 38 to the edge of the rotor.

Chambers B are formed with substantially tangential surfaces 41.

Each compression chamber is formed with a slot 42 for a purpose to be subsequently described.

The portion 43 of the rotor toward the center from chambers A and B are reduced in width to decrease the weight of the rotor.

Portion 43 is connected to a hub 44 which is in turn joined by spokes 46 to a second smaller hub 47 which is keyed by key 48 to shaft 27. The opening formed between hubs 44 and 47 is utilized to allow cooling air to pass through the rotor to aid in cooling the engine. A fan 49 is attached to the output shaft 27 of the motor.

The space between hubs 44 and 47 allows air to be drawn through by fan 49 and a housing 50 is attached to member 21 and cover plates 19 and 20 to direct the cooling air over the position of the engine adjacent the combustion point. This cools the engine.

A transfer tube 51 is attached to the cover plate 19 of the engine and supplies pre-compressed air from the compression chambers B to the combustion chambers A. The upper end 52 of tube 51 communicates with an opening 54 through cover plate 19. This opening is placed so that slots 42 in the compression chambers B communicate with it, but there is no communication between the opening and the combustion chambers A.

The lower end 53 communicates with an opening 56 in cover plate 19 adjacent the bottom (relative to FIGURE 4 of the engine). The tube 51 thus allows air which has been compressed in chambers B due to the rotor eccentricity to be supplied to the combustion chambers A while they are still at the bottom of the engine before compression commences.

As best shown in FIGURE 6 fuel is supplied to the air passing through tube 51 to the combustion chambers A from compression chambers B by means of a carburetor 57. A venturi 58 is mounted to tube 51 and portion 53 and gasoline or other fuel is drawn into the air by suction through openings 59. The fuel passes from tank 61 through a check valve 62 to a header 63 which communicates with openings 59.

An air release valve 64 is also mounted in tube 51 and comprises a ball 66 which normally seats in an opening 67 in tube 51. A spring 68 holds the ball and a thumb screw 69 adjusts tension on the spring. An outlet pipe 71 communicates with the ball valve to allow pressure relief.

Figure 5:
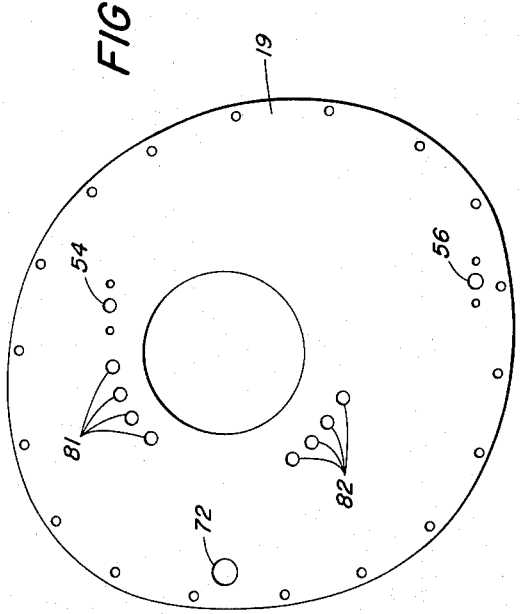
FIGURE 5 is a view of a cover plate of the engine.

Exhaust ports 72 are formed in plates 19 and 20 at about nine o'clock relative to FIGURES 1 and 5 to allow burned gases to escape from the engine.

Figure 7:
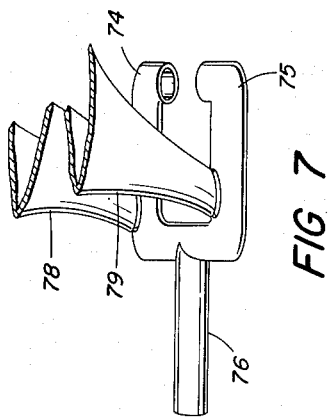
FIGURE 7 is a detailed sectional view of the exhaust system of this invention.

FIGURE 7 illustrates exhaust pipe 73 which has legs 74 and 75 which connect to plates 19 and 20 over openings 72. An outlet pipe 76 is attached to legs 74 and 75.

As shown in FIGURE 1 the lower end 77 of cooling housing is formed into tubes 78 and 79 which feed into tubes 78 and 79 which feed into the legs 74 and 75 to give suction to aid in removing the exhaust gases from the engine.

A first series of openings 81 are formed in cover plate 19 adjacent but behind openings 59 relative to the rotation of the rotor. These openings communicate with slots 42 of the compression chambers to relieve the low pressure as the chamber gets larger thus decreasing the drag on the engine.

A second series of openings 82 are formed at about 7 o'clock in plate 19 to allow air to enter compression chambers B through slots 42.

The portion of the engine adjacent the spark plug opens fast to allow great efficiency in the combustion portion of the operation. Also the setting of vanes 33 at the angle indicated greatly increases the efficiency in that the gases produce a greater moment than if the vanes were radially mounted.

Also the shape of chambers A which have surfaces 38 and 39 increase the efficiency of the engine.

The compression chambers B contain more volume than the combustion chambers A to assure that large amount of air will be fed into chambers A from chambers B.

Oil is mixed with the fuel so that the engine is well lubricated.

The ignition and starting system of the engine may be conventional and is not illustrated. The spark plug fires when the combustion chambers are adjacent it.

In operation, air is admitted through slots 42 into the compression chambers B as they pass openings 82. This air is compressed until the chamber B is adjacent opening 54 of transfer tube 51 and the compressed air passes through slot 42 through tube 51 and carburetor and into a combustion chamber A through opening 56. As the rotor continues to rotate counterclockwise, the fuel-air mixture in the combustion chamber will be further compressed due to the rotor's eccentricity. When chamber A passes the spark plug, it will fire and ignite the fuel and the power stroke commences. The vanes seal the combustion and compression chambers due to their close fit and centrifical force. The burned gases are exhausted through exhaust ports 72. Thus, the compression chambers pre-compress the air supplied to the combustion chambers and provide insulation between adjacent combustion chambers. Since the fuel is added in transfer tube 51 less chance of ignition of a compression chamber exists since it has no fuel in the air.

The placement of the vanes in the combustion chamber at the angle indicated greatly increases the efficiency as does the shape formed by surfaces 38 and 39.

Although the invention has been described with respect to a preferred embodiment it is not to be so limited as changes and modifications may be made which are within the full intended scope as defined by the appended claims.

I claim:

1. A rotary engine comprising a housing, an eccentric rotor rotatably supported by the housing, a first plurality of vanes mounted in substantially radial slots in the rotor, a second plurality of vanes mounted in non-radial slots in the rotor with the substantially radial and non-radial vanes alternately spaced, the vanes forming with the rotor and housing alternate compression and combustion chambers, a spark plug mounted in the housing to ignite fuel in the combustion chambers when they are near their maximum volume, a transfer tube connected to the housing to transfer compressed air from the compression chambers to the combustion chambers, and means for supplying fuel to the combustion chambers.

2. In apparatus according to claim 1 wherein the combustion chambers are formed by the vanes, the housing and the rotor and wherein the rotor portion of the combustion chambers is formed of two surfaces substantially at right angles to each other so as to increase the efficiency of the engine.

3. A rotary engine comprising a housing, a rotor mounted eccentrically within the housing, a first plurality of vanes mounted in substantially radial slots in the rotor and extending between the rotor and housing, a second plurality of vanes mounted in non-radial slots in the rotor and extending between the rotor and the housing and the first and second plurality of vanes mounted alternately to form with the rotor and housing alternate combustion and compression chambers, the periphery of the rotor in the combustion chambers formed with indentions to increase the efficiency of the engine, a transfer tube which at one end communicates only with the compression chambers as they pass and which communicates with the combustion chambers as they pass at its other end, an igniter mounted in the housing adjacent the maximum compression point, an exhaust port formed in the housing to allow burned gases to escape, and a fuel system for providing fuel to the combustion chambers.

4. In apparatus according to claim 3, slots formed in edges of the rotor from the compression chambers toward the center of the rotor, and the first end of the transfer tube in communication with said slots as the compression chambers pass.

5. In apparatus according to claim 4 vacuum relief openings formed in the housing after the point of minimum volume and the slots from the compression chambers toward the center of the rotor passing by said openings.

6. In apparatus according to claim 4 air supply openings formed in the housing before the point of maximum volume and the slots from the compression chambers toward the center of the rotor passing said air supply openings.

References Cited by the Examiner

UNITED STATES PATENTS 1,922,363 8/53 Hapkins _____ 123—16
3,076,446 2/63 Lockhart _____ 123—16

FOREIGN PATENTS 797,578 2/36 France.
515,189 2/55 Italy.

DONLEY J. STOCKING, *Primary Examiner.*

KARL J. ALBRECHT, *Examiner.*